Patented Aug. 13, 1940

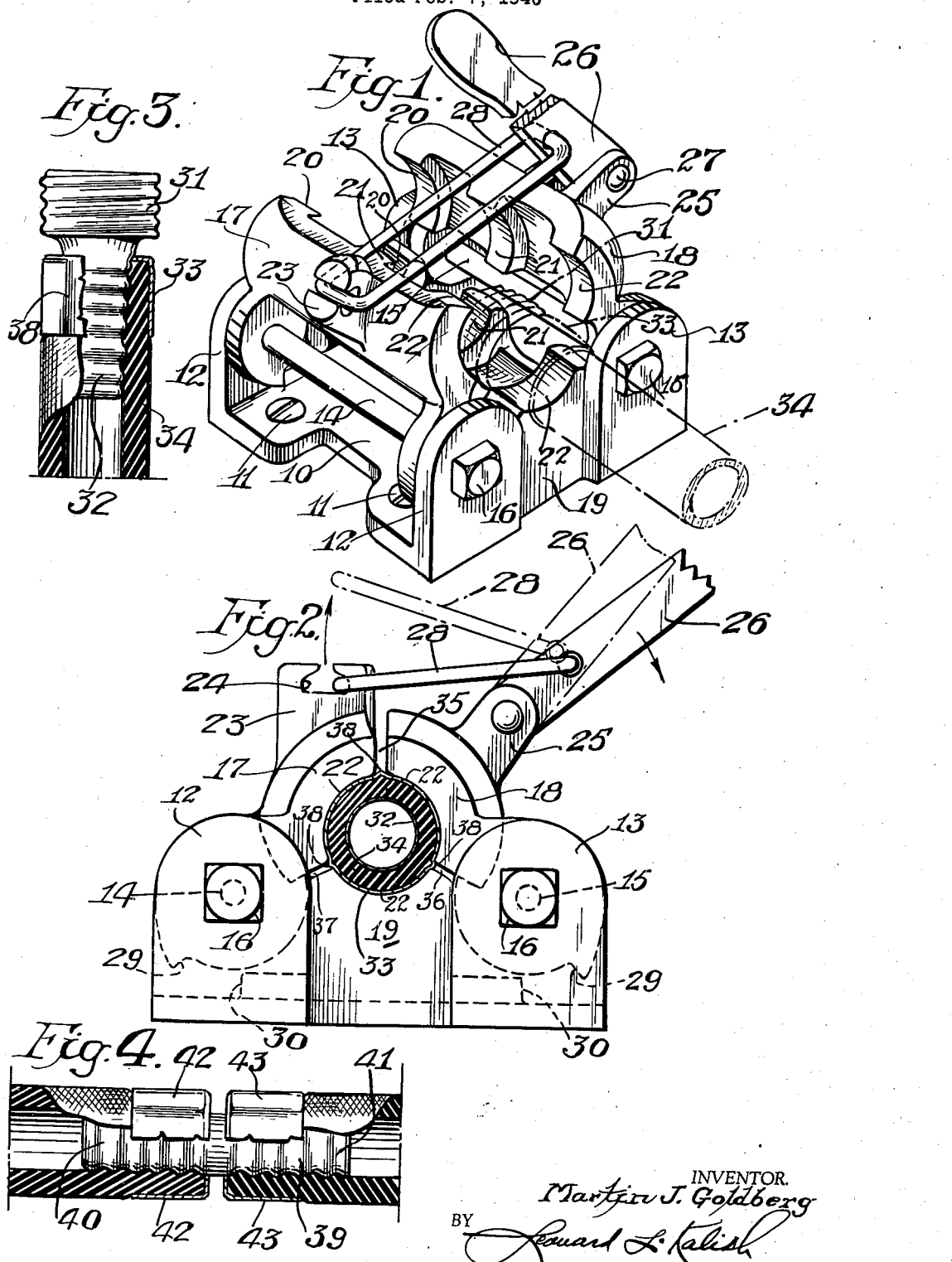

2,211,008

UNITED STATES PATENT OFFICE 2,211,008

HOSE COUPLING ATTACHING APPARATUS

Martin J. Goldberg, Philadelphia, Pa.

Application February 7, 1940, Serial No. 317,630

2 Claims. (Cl. 153—1)

The present invention relates to a new and useful manually operable ferrule-clamping press-implement for use in generally permanently attaching various hose couplings to the ends of hoses.

For the purpose of illustrating the invention, there is shown in the accompanying drawing one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Figure 1 represents a perspective view of apparatus constituting one illustrative embodiment of the present invention, shown open and with a preliminarily assembled hose coupling indicated in dashed-dotted lines, and hose end operatively positioned therein.

Figure 2 represents a side elevational view of the apparatus illustrated in Figure 1 as the same appears when operatively clamped around the end of the hose.

Figure 3 represents a slightly enlarged view, partly in elevation and partly in section, showing the assembled hose coupling and hose end.

Figure 4 represents a view, partly in section and partly in elevation, showing a different type of hose coupling operatively connecting together the juxtaposed ends of two lengths of hose;—the component parts at the joint having been operatively assembled by the apparatus illustrated in Figures 1 and 2.

As illustrated in Figure 1, the coupling-attaching device of the present invention includes a basal portion 10, which may be secured to the top surface of the work bench by any suitable means as for instance by means of a plurality of screws or bolts 11, which extend through suitable openings in the basal portion 10. Along the sides of this basal portion 10 are disposed two pairs of juxtaposed upwardly-extending lug-portions 12 and 13, preferably formed integrally with the base portion 10. Pivot-rods 14 and 15 extend between the pairs of lugs 12 and 13 respectively, with the ends of these pivot-rods being supported by said lugs in any suitable fashion, as for instance by being extended through registering openings in said lugs, and with each of said rods terminating in an enlarged head portion at their one end, and having a nut screw-threadedly secured to their opposite end.

On these pivot-rods 14 and 15 are pivotally mounted a pair of segmental clamping-blocks 17 and 18 which, together with the raised central clamping-portion 19 of the base 10, jointly form a generally tubular passageway extending longitudinally through the device when the clamping-blocks 17 and 18 have been swung together at the top.

Each of the clamping-blocks 17 and 18 and the raised central clamping-portion 19 of the base 10 are provided with a series of corresponding inwardly extending arcuate rib portions 20, 21, and 22 of gradually increasing diameter. When the pair of clamping-blocks 17 and 18 have been swung together, their arcuate rib portions 20, 21, 22, in conjunction with the corresponding rib portions of the central basal portion 19, compositely form three separate and distinct generally annularly-continuous cylindrical clamping surfaces of successively increasing diameter, the cylindrical surface compositely formed by the ribs 20 being smallest in diameter, and the cylindrical surface formed by the next ribs 21 being of slightly larger diameter, and the cylindrical surface formed by the ribs 22 being largest in diameter. The provision of clamping surfaces of varying diameters adapts the device for use with hose couplings and hoses of varying diameters.

One of the segmental clamping-blocks 17 bears an outwardly-extending boss 23 across which extends a slot 24 paralleling the longitudinal axis of the device. As more particularly illustrated in Figure 2 slot 24 may be approximately of frusto-conical cross-sectional outline, with its outermost gap being substantially narrower in width than the slot width at its base. The cooperating clamping-block 18 may bear a pair of juxtaposed outwardly-extending lug-portions 25, to which may be pivotally secured the lower end of a hand lever 26 by the pivot-pin 27, which may extend through the lugs 25, and the intermediate lever 26, and which may have its projecting end-portions upset to secure it against removal. A preferably continuous toggle-link 28 is pivotally attached at one end to the lever 26, and has its other end adapted for quick attachable and detachable engagement with the slot 24 in the boss 23 on the opposite clamping block 17. Thus the end portion of the toggle-link 28 remote from the hand lever 26 is so proportioned with respect to the narrow gap at the top of the slot 24 that it may pass readily through said gap on its way into or out of said slot.

In actual operation, assuming the toggle-link 28 to be engaged in the slot 24, movement of the hand lever 26 in a clock-wise direction viewed from the position illustrated in Figure 1 or 2 draws the toggle-link 28 to the right, thereby pivoting the left-hand clamping-block 17 to the right towards the longitudinal center of the device, while the juxtaposed right-hand clamping-block 18 is simultaneously pivoted to the left towards said center. As a result, these clamping-blocks 17 and 18 are drawn firmly together, and due to the high mechanical advantage afforded by the hand lever and toggle-link arrangement, the force with which these clamping-blocks may be drawn together is considerable.

When it is desired to open or separate the clamping-blocks, all that need be done is to pivot the hand lever 26 in the opposite counter-clockwise direction. This causes the left end of the toggle-link 28 in the slot 24 to slide across the base of the slot to the left side thereof and then push the block 17 to the left, while the juxtaposed block 18 is simultaneously swung to the right. The permissible degree of separation of these clamping-blocks 17 and 18 may be limited by any suitable stop means, as for instance by a stop-surface 29 associated with each of the pivoting clamping-blocks and pivotable into direct contact with a co-acting stop-surface 30 formed integrally with the basal portion 10.

One of the many different kinds of hose couplings which may be permanently assembled to a hose-end by means of the implement forming the subject matter of the present invention has been illustrated in Figure 3, and will be seen to include an externally threaded outer portion 31, and a substantially-corrugated nipple-portion 32 of reduced diameter. A ferrule 33, which may be formed of any suitable deformable metal, as for instance sheet brass or the like, is loosely mounted on and surrounds the nipple-portion 32. After the hose-end 34 has been slipped on the nipple-portion 32 of the coupling, with the ferrule 33 encircling the end-zone of the hose, the thus-assembled elements may be positioned inside the clamping-device of the present invention in the manner illustrated in Figure 1, with the ferrule 33 lying on that particular segmental clamping-surface 20, 21 or 22 of the basal portion 19 which most nearly corresponds with the desired ultimate diameter of the ferrule 33. The hand lever 26 is then operated to draw the clamping-blocks 17 and 18 forcibly together, thereby clamping the ferrule 33 tightly down over the hose-end 34 and permanently crowding the hose into intimate engagement with the corrugated coupling nipple-portion 32. As the clamping-jaws 17 and 18 are forced radially inwardly against the ferrule 33, the latter becomes somewhat reduced in diameter, and the excess material is forced radially outwardly and enters the narrow gaps 35, 36 and 37 between the clamping-blocks 17, 18 and 19, thereby forming longitudinal rib-like portions 38 along the exterior surface of the now tightly-clamped ferrule 33.

When it is desired permanently to join together or couple the ends of two lengths of hose, a tubular coupling 39 like that illustrated in Figure 4 may be employed. This coupling has opposite nipple-like substantially-corrugated end-portions 40 and 41, and has associated therewith ferrules 42 and 43, each adapted to be crimped down over the two hose-ends thereby permanently to secure them on the coupling nipple-portions 40 and 41. In operatively assembling the arrangement illustrated in Figure 4, the apparatus forming the subject matter of the present invention is operated twice, once for crimping the ferrule 42 down over its associated hose end to secure said hose end on the coupling nipple-portion 40, and a second time for crimping the second ferrule 43 down over the other hose end on the opposite coupling nipple-portion 41. The thus operatively coupled hose-ends may then be readily and easily removed from the apparatus of the present invention by merely disengaging the toggle-link 28 from the clamping-block 17, and pivoting said link into a non-obstructing position relative to the hose, all as indicated in dashed-dotted lines in Figure 2. The coupled hose-ends may then be lifted from their seat in the apparatus and withdrawn therefrom with one quick move. If the toggle-link 28 were not disengageable, the top portion of the working space would be permanently obstructed thereby, and accordingly whenever two hose-lengths had been permanently operatively connected together by a hose coupling 39 like that illustrated in Figure 4, the assembled hoses could then only be removed from the apparatus by sliding one of the lengths of hose in its entirety axially through the press. The detachability of the toggle-link 28 in the device of the present invention obviates this difficulty, and materially decreases the amount of work and the time involved in permanently coupling together two lengths of hose.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent is

1. A manually-operable ferrule-clamping press-implement for use in generally permanently affixing hose couplings to hose-ends comprising a base-block having a raised central portion, juxtaposed clamping-blocks pivotally secured to said base-block on opposite sides of said raised central portion, said clamping-block being swingable towards and away from each other, stop means limiting the separation of said blocks, said raised central portion and said clamping-blocks each having segmental concavely-cylindrical surfaces adapted compositely to form a generally tubular passageway extending longitudinally through said implement when said clamping-blocks are swung together, said raised central portion of said base-block and said clamping blocks each bearing a series of registering inwardly-extending arcuate ribs compositely forming a series of more or less annularly-continuous cylindrical surfaces of varying diameters, boss means extending outwardly from each of said clamping-blocks near the upper portions thereof, and a hand lever pivotally secured at one end to the boss means associated with one of said clamping-blocks, a slot extending across the boss means associated with the other one of said clamping-blocks in a direction generally parallel to the longitudinal axis of said implement, said slot being of minimum width at its mouth and gradually increasing in width as it progresses inwardly, and a toggle-link pivotally secured at its one end to said hand lever having its opposite end portion engaged in said slot, said latter end portion of said toggle-link being sufficiently narrow with respect to the mouth of said slot to permit its ready insertion into or removal from said slot.

2. A hand press-implement of the character described for use in generally permanently affixing hose couplings to hose-ends comprising a base-block having a raised central portion, juxtaposed clamping-blocks pivotally secured to said block on opposite sides of said raised central portion and swingable towards and away from each other, said raised central portion and said clamping-blocks each having segmental concavely-cylindrical surfaces adapted compositely to form a generally tubular passageway extending longitudinally through said implement when said clamping-blocks are swung together, said raised central portion of said base-block said clamping-blocks each bearing a series of registering inwardly-extending arcuate ribs compositely forming a series of more or less annularly-continuous cylindrical surfaces of varying diameters, a hand lever pivotally secured at one end to one of said clamping blocks, said lever being swingable in a plane generally perpendicular to the longitudinal axis of said implement, and a toggle-link carried by said lever extending transversely across the top of said implement and having its end portion detachably engaged with the other one of said clamping-blocks.

MARTIN J. GOLDBERG.